UNITED STATES PATENT OFFICE.

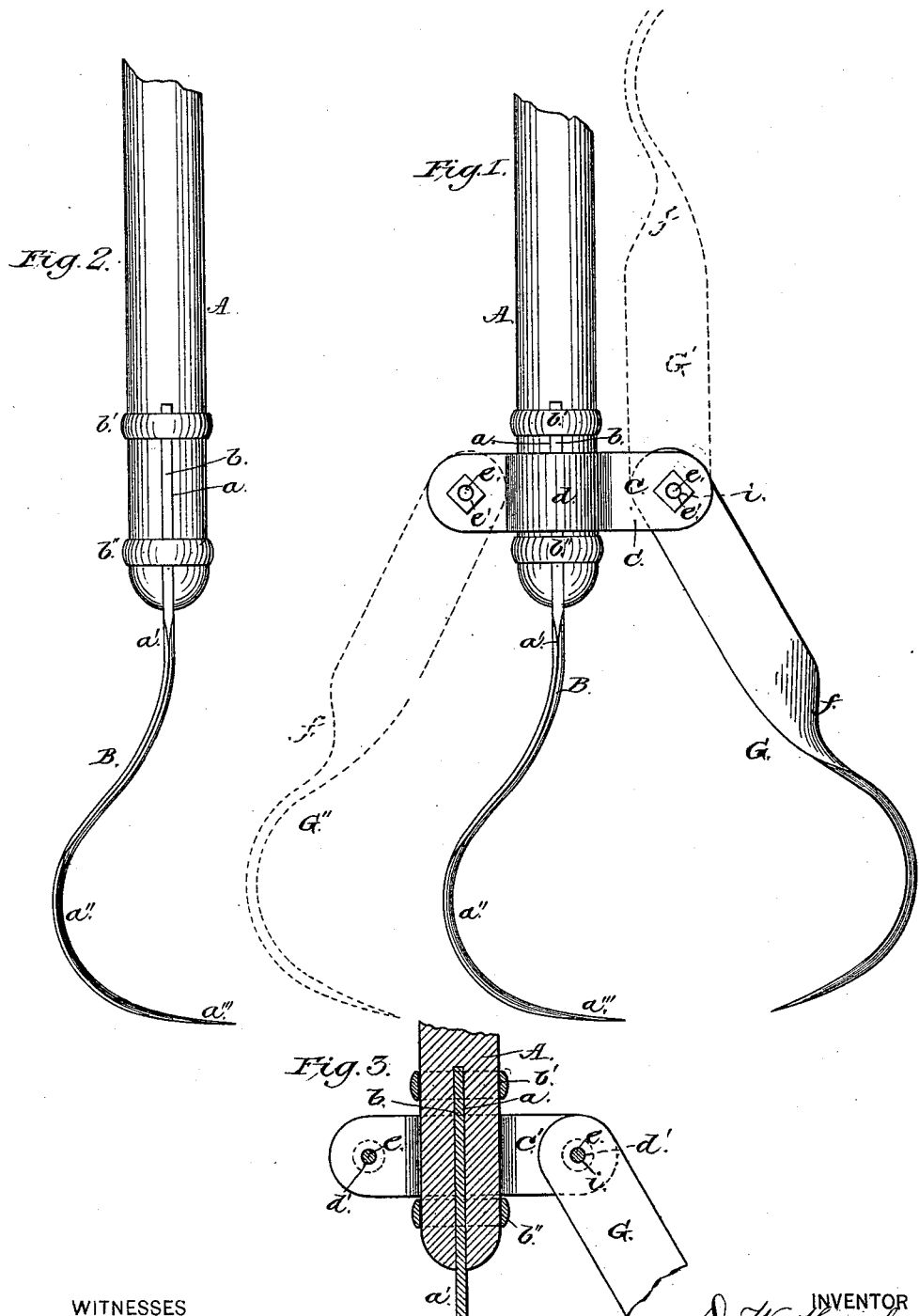

DAVID W. HUGHES, OF HAMILTON, OHIO.

HAND-CULTIVATOR.

SPECIFICATION forming part of Letters Patent No. 233,762, dated October 26, 1880.

Application filed July 17, 1880. (No model.)

*To all whom it may concern:*

Be it known that I, DAVID W. HUGHES, of Hamilton, in the county of Butler and State of Ohio, have invented a new and valuable Improvement in Hand-Cultivators; and I do hereby declare that the following is a full, clear, and exact description of the construction and operation of the same, reference being had to the annexed drawings, making a part of this specification, and to the letters and figures of reference marked thereon.

Figures 1 and 2 of the drawings are representations of side views of my improved cultivator, and Fig. 3 is a detail section.

This invention has relation to improvements in hand-cultivators for plants and vegetables grown in rows; and it consists in combining with a handle and a curved blade fixed thereto, and a removable and adjustable clamp a curved blade fixed on said clamp removably and adjustably, as hereinafter shown and described.

In the annexed drawings the letter A designates a wooden handle, of suitable length, having in its end a deep cleft, $a$, designed to receive the tang $b$ of the blade B. This blade is of flat form transversely, and reaches, for a certain distance, when inserted in said cleft, beyond the end of the handle in line therewith, as indicated at $a'$. It thence is bent outward in a curve, $a''$, and again extends inward at $a'''$, the working portion of said blade being, therefore, in a plane at right angles to the length of the handle. The blade B, when inserted in the handle, is secured by means of the rings $b'$ $b''$, passed successively over the handle and clamping its cleft end against the blade. The rings are at a suitable distance apart, and thus prevent the tang of the blade from escaping from the cleft by an edgewise movement.

This device is used by placing the blade alongside the rows of plants and dragging it, by means of the handle, over the ground. The working portion of the blade buries in the ground, turns up the soil, and severs the roots of grass and other growths. It at the same time throws the earth toward the roots of the plants.

C indicates a clamp, composed of two metallic plates, $c$ $c'$, having each a central curved portion, $d$, and in its ends the perforations $d'$. The curved portions $d$ of these plates bear against the handle between the rings $b$ $b'$, and the said plates are clamped on the same by means of the bolts $e$, passing through the perforations $d'$, and the nuts $e'$ applied upon their threaded ends. The ends of the clamp extend considerably beyond the handle, and that farthest from the blade carries a second blade, G, in all respects similar to the said blade except that its shank is bent, as indicated at $f$. This blade G is inserted between the ends of the plates $c$ $c'$, and is secured thereto adjustably by means of one of bolts $e$, which passes through a perforation, $i$, in its shank, when the working end of said blade having been adjusted at the desired distance from that of blade B, it is secured to the clamp by the forcible setting up of the nut $e'$. By loosening this nut the blade G may be swung up into the position indicated by the letter $G''$ in dotted lines, and secured by resetting said nut, or by slightly loosening both nuts the clamp may be swung around the handle and blade G brought into the position indicated in dotted lines at $G'''$, when both of said blades may be used on the same side of the row, and will conduce to throw the earth inward upon the roots of the plants.

What I claim as new, and desire to secure by Letters Patent, is—

The combination, with the handle A and the curved blade fixed thereto, of the removable and adjustable clamp C and a curved blade fixed on said clamp removably and adjustably, as set forth.

In testimony that I claim the above I have hereunto subscribed my name in the presence of two witnesses.

DAVID W. HUGHES.

Witnesses:
W. A. HUME,
H. C. HUME.